2,881,133

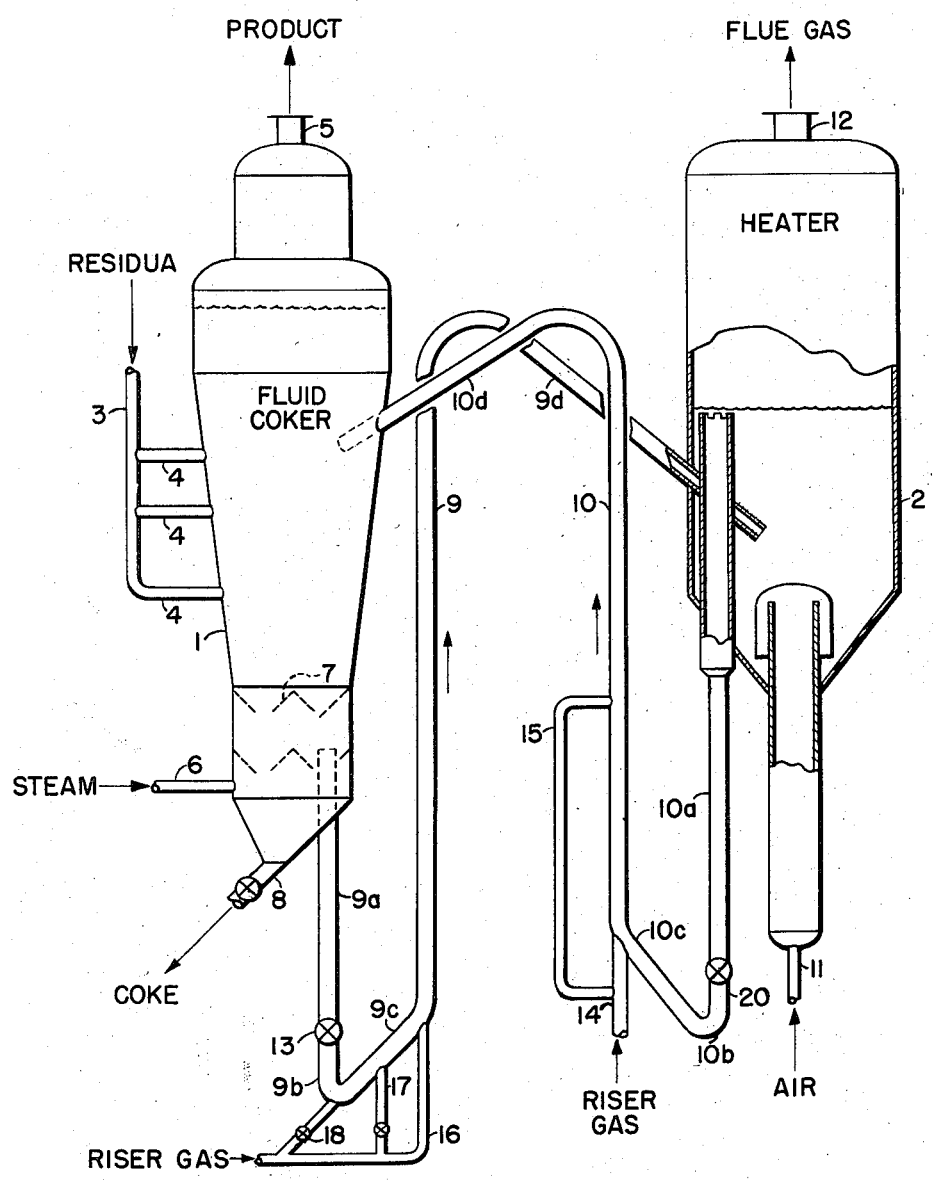

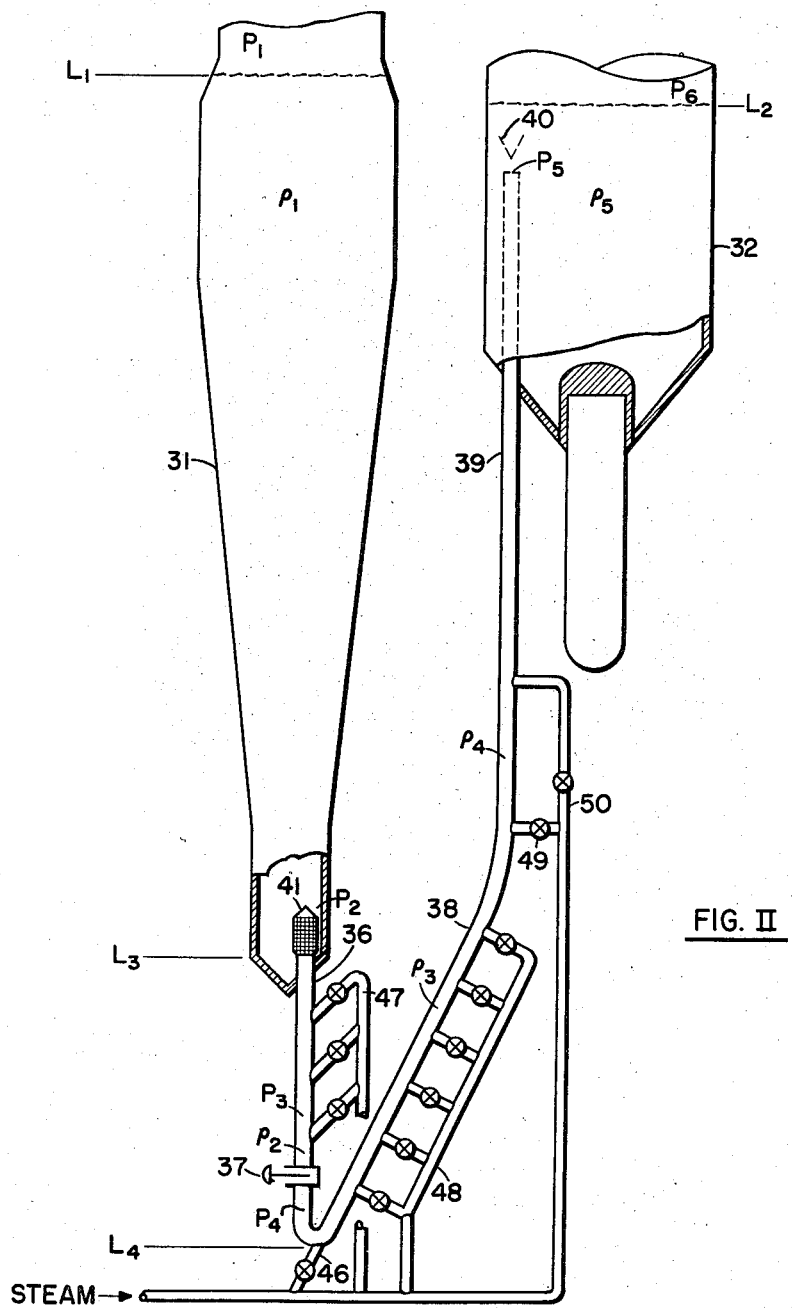
FIG. II
ROBERT S. WHITELEY
BYRON V. MOLSTEDT INVENTORS
BY L. Chasan
ATTORNEY united States Patent Office 2,881,133
Patented Apr. 7, 1959

METHOD AND APPARATUS FOR HANDLING FLUIDIZED SOLIDS

Robert S. Whiteley, Baton Rouge, and Byron V. Molstedt, East Baton Rouge, La., assignors to Esso Research and Engineering Company, a corporation of Delaware Application June 28, 1954, Serial No. 439,702

4 Claims. (Cl. 208—164)

This invention relates to the transporting of finely divided solids. Specifically, this invention is concerned with a system wherein finely divided solids are circulated between two or more treating zones to be subjected therein to different treatments. The invention is particularly applicable to processes wherein the atmosphere in each treating zone is different and no mixing between the gasiform reactants in each zone is permissible.

The fluidized solids technique of contacting solids with gases or liquids has recently been applied in many commercial applications, particularly in the petroleum refining industry. This technique is now used in refining to catalytically crack gas oils, hydrocrack naphthas, pyrolytically upgrade residua, etc. Many of the designs utilize a two-vessel system in handling fluidized solids, i.e., a reactant is treated in a reaction zone by contact with the solids, and the solids are then continuously transferred to a regeneration or combustion zone and back.

Normally most two-vessel systems utilize a standpipe and a riser to transfer the solids from one vessel to the other. By this means fairly steady flow of the solids is obtained and back flow of the solids is prevented. Reference is made to Packie patent, U.S. 2,589,124, wherein a conventional type of standpipe arrangement is set forth, having as essential features a U-seal at the base of the transfer line, which prevents the flow of gases from one vessel to the other, and the addition of controlled amounts of gas to the riser to control the rate of flow of the solids.

Mechanically this U-bend is an excellent design and it has functioned well, especially when applied to fluidized solid catalyst cracking systems. It is, however, somewhat difficult to reduce and control accurately the pressure drop through this type of bend to a desired low value when solids considerably coarser than conventional catalysts are handled. In order to do so, large quantities of aeration gas are required with very extensive distribution.

In hydrocarbon oil fluid coking operations, the particulate solids used are coarser than those used in catalytic cracking, are not as closely sized and are, therefore, more free flowing. While the catalytic cracking catalyst may have a particle size on the average of 80 microns more or less, the finely divided coke used in fluid coking operations ranges in size from 40 to 800 microns, with 175 to 200 microns being about the average size. When using the Packie type U-bend to transfer coke, higher pressure drops have been encountered. This higher pressure drop seems to be characteristic of coarse solids which deaerate rapidly and tend to slug, especially when flowing horizontally or laterally.

Further, it is not always convenient to arrange the vessels such that the most efficient type of U-bend arrangement is obtained. Thus in many instances it has been found necessary to provide for the conveyance of the solids laterally or horizontally in order to achieve the most economical vessel arrangement.

By an improved design the present invention attains a low pressure drop in the bend connecting a fluidized solids standpipe and riser with a minimum of aeration and adequately provides for the lateral movement of the solids. The design of the present invention is characterized by the following features:

(1) A vertical standpipe section which provides a maximum pressure buildup;

(2) A sharp bend at the bottom of the standpipe, the radius of which is preferably about equal to or less than one pipe diameter, consistent with adequate mechanical strength;

(3) A slanted riser side, which is sloped at least 50°, preferably 60° or more, from the horizontal;

(4) A bend of fairly large radius, connecting the slanted riser with a vertical riser, a radius of 5 feet or 5 pipe diameters, whichever is greater, being preferred to minimize pressure drop;

(5) Usually a vertical riser leading directly into a receiving vessel or into a transfer line sloping downward into such a vessel at an angle of 15° or more from the horizontal, preferably 45° to 70°.

This latter line achieves the required lateral transport with a minimum of pressure drop and a maximum of smoothness in flow.

A valve is used to help control the flow of the solids. Preferably the valve is placed in the lower portion of the standpipe within 1 to 5 pipe diameters of the acute bend, but may be located elsewhere, as in the lower portion of the vertical riser.

For convenience, the features of a vertical standpipe, a relatively acute bend, and a slanted riser will be hereinafter referred to as a J-bend.

It has been found desirable, particularly for materials having fairly smooth surfaces and that deaerate rapidly, to have the angle of the conduits moving the material upwardly and laterally steeper than the angle of repose of the particulate solid material. Generally, this means that the angle should be above 50° from the horizontal, preferably 60° or more. Thus, as the material deaerates, rather than remaining stagnant or stationary in the conduit, it will slide in the conduit to a place adjacent to an aerating gas inlet whereby it will be refluidized. In the case of the downwardly inclined conduits, this requirement is not as critical. Downwardly inclined lines should be inclined more than 15° from the horizontal, preferably from 45° to 70°.

An object of this invention is to provide the art with an improved method of transporting particulate solids. A specific object is to design a system for circulating finely divided solids between solid-gas contacting zones, and in the system providing for a J-bend in the conveying conduit of lower elevation than the contacting zones, whereby flow of gas between the contacting zones is prevented. A still further object is to design a sealing section in a solids conveying conduit in a fluidized solids system characterized by low pressure drop.

These and other objects and advantages will become apparent as this description proceeds. The attached drawings, forming a part of this specification, will be described in detail to further elucidate this invention.

In Figure I there is diagrammatically depicted a conduit system designed in accordance with the teachings of this invention, utilized to transfer solids between reaction vessels in a hydrocarbon oil fluid coking system.

Figure II is an enlarged schematic view of the J-bend, showing in particular the placement of aeration taps. The vertical riser is shown as terminating within a reaction vessel.

Referring now to Figure I, there is shown a conventional hydrocarbon oil fluid coking vessel 1 and a combustion zone or heater 2 used to supply heat to the process. The vessels contain fluidized beds of finely divided solids having a particle size of about 40 to 800 microns. Coke produced by the process is customarily used as the heat-carrying solid, but other solids such as sand, pumice, spent catalyst, etc. may be used.

The oil to be pyrolytically upgraded, for example, a South Louisiana vacuum residuum, enters the process by line 3 and is admitted to the coking vessel at a plurality of points by lines 4. The oil contacts solids which have a temperature of about 950° F. and evolves considerable quantities of hydrocarbon vapors and deposits carbonaceous residue on the fluidized solids. The vapors are removed overhead by line 5 as product, and may be subjected to further processing as desired.

Steam is admitted to the base of the vessel at a plurality of points, one of which is shown as line 6. This steam serves to fluidize the bed and also to strip the solids in the lower portion of the vessel of hydrocarbon vapors. It is customary to use superficial fluidizing velocities in the range of 0.5 to 3.0 feet per second. Velocities as high as 4.0 to 5.0 feet per second can be used in some parts of the vessel.

Because the fluid coking process produces an excess of coke beyond that required to be burned to supply heat to the process, a portion of the solids in the system must be removed as product. This excess coke is removed by line 8. Baffles 7 in the lower portion of the coker promote the mixing and contacting of the solids with the fluidizing and stripping gas.

A portion of the fluid bed is continuously removed by line 9 and transferred to combustion zone 2. Air or other oxidizing media is supplied to the base of the combustion zone by line 11 and serves to fluidize carbon particles therein, and to support partial combustion of them. By this partial combustion, the temperature of the solids in the combustion zone is raised 100° to 300° F. or more above the temperature of the particles in the coking vessel. The flue gas formed during combustion is removed overhead by line 12 and is vented to the atmosphere.

Heated solids are continuously withdrawn from the combustion zone by line 10a and are circulated to the coking vessel. By this means the necessary heat for the pyrolysis is supplied.

The apparatus so far described is conventional, and no attempt is made herein to claim features of fluid coking. Equipment other than has been described may satisfactorily serve in some applications. Thus, a gravitating bed type of operation may be satisfactory, or a transfer line reactor may be substituted for either the coking vessel or the heater. Also, it is to be understood that this invention is applicable to any fluidized solids system such as those used for catalytic cracking, naphtha reforming, etc. It is particularly applicable to fluid hydroforming systems wherein an inert, heavy, particulate solid, i.e. a "shot" circulation system, is used as a heat-carrying medium.

According to the present invention the circulating solids are passed through a conduit system of special design. With reference to the solids being moved from the coking vessel to the heater, the solids first pass downwardly through a standpipe 9a. This standpipe is of sufficient height to create the pressure necessary to balance the pressure differential between the coking vessel and the heater, the counter-balancing pressure in the vertical riser and to overcome frictional losses.

At the base of the standpipe, the material passes through a valve 13 and then passes around an acute bend 9b and thence moves upwardly through an inclined section 9c. The restriction or valve is preferably located within 1 to 5 pipe diameters from the bend, although its placement is not critical. Preferably the bend has a radius of less than one pipe diameter, and the inclined riser is inclined more than 50° from the horizontal. The lateral transport of the solids through the inclined riser should be as short as possible. Generally, the length of the inclined riser should be sufficient to clear the vessel. It may, however, be longer in certain applications and still operate smoothly. Thus, the slanted riser can be used to span fairly short lateral distances, and the upper conduit hereinafter referred to, used to move the solids horizontally, may be dispensed with. Aerating gas is admitted to the inclined section and to the short radius bend to control the density and mobility of the solids suspension. Lines 17 and 18 illustrate points of admission of aerating gas to line 9c.

Having passed through the J-bend, the solids suspension is considerably diluted by gas supplied by line 16. This gas decreases the density of the solids suspension and creates a driving force that moves the suspension through the conduit; i.e., the density of the solids suspension in the vertical riser 9 will be less than either the density in the fluid coking vessel or the vertical standpipe 9a. By judicious control of the amount of riser gas added at this point, and by regulation of the pressure loss through valve 13, the rate of solids circulation is readily controlled.

In some instances it may be preferred to use a reactant gas in the process as this riser gas. Thus, air may be admitted by line 16 to pipe 9, and will not only help convey the solids, but will support a partial combustion. In applications where inert gas must be used, it is preferred to use steam as the riser or aerating gas.

The suspension, having reached the desired elevation in the vertical riser, is directed by a long radius bend to a slanted conduit 9d and thence is conveyed to the combustion zone 2. As previously explained, this downwardly slanted conduit has an angle of 15° to 70°, e.g., 45°, from horizontal and may be provided with suitable aeration points.

The conduit system for transporting solids from the combustion zone to the fluid coking vessel is practically the duplicate of that just described. Thus, the solids enter a vertical standpipe 10a, and pass through a valve 20 and an acute bend 10b, up through a riser section 10c to a vertical riser section 10. Having achieved proper elevation in the vertical riser section, the solids are moved to the coking vessel by an inclined section 10d. Riser gas, e.g., steam, is admitted to the base of the vertical riser section by line 14.

Throughout the conveying system it is desirable to add aerating gas at a plurality of points to provide for proper control of the moving mixture and for dispersion of the gas in the suspension. One of these alternate points of admission is shown by line 15.

With reference to Figure II, the manner and conditions of operation of this invention will be more particularly described.

A J-bend similar to the one described in connection with Figure I is shown connecting a fluid coking vessel 31 and a heating vessel 32 both of which contain fluidized beds of particulate coke. There is shown a conduit system for conveying the coke from the stripping zone in the lower portion of the coking vessel to the combustion zone.

A screen 41 is placed around the inlet of the standpipe 36, to prevent oversized particles and agglomerates from entering the standpipe and blocking the passageways.

Manifold 47 supplies aeration gas to the standpipe 36. Generally only enough aeration gas is added to these points to maintain the density of the solids suspension substantially constant as it flows down the standpipe and the pressure increases. It has been found that aeration taps placed 4 to 20 feet apart, preferably 4 to 12 ft. apart, give sufficient control. This aeration gas will flow upwardly at low solids velocities but will at higher velocities move downwardly with the solids.

A slide valve 37, located in the lower portion of the standpipe, creates a pressure drop that prevents reversal of flow of the solids suspension because of slugging and surging of the system. The pressure drop created by the valve amounts to 2 to 40% of the available pressure drop over the solids conveying conduit $P_3$—$P_5$. It is to be understood that other valves may be located elsewhere in the conduit system if it be desired.

There is located at the base of the bend an aeration gas inlet 46, which may serve as a jet in some instances, to prevent accumulation of solids at this point because of the change in direction of flow. In some applications, a major part of the aerating or riser gas used to dilute the solids-suspension can be added through inlet 46.

Preferably, however, the aeration gas is also admitted to the inclined riser 38 from manifold 48 to control the density of the solids-suspension and therefore to control its mobility and further amounts are added in the lower portion of the vertical riser. Generally the density of the suspension in the inclined riser is maintained at a value intermediate between the density existing in the standpipe 36 and the vertical riser 39. Good control is obtained by locating an aeration tap every 1 to 3 pipe diameters. Preferably, the taps are spaced close together near the bottom bend and are spaced progressively wider apart in the direction of solids flow. More than one tap can be located at any one point to secure better gas distribution.

Aerating gas admitted to the base of the vertical riser 39 through line 49 will amount to 0 to 3 ft.$^3$ per pound of solid conveyed. For more uniform distribution, this riser gas may be added at several points along the riser, one of which is shown by line 50.

The solids emerging from the vertical riser are deflected by a baffle 40 into the fluid bed combustion zone in vessel 32. Alternatively, the solids can be conveyed upwardly in the vertical riser outside of the reaction vessel and then be introduced in the upper portion of the vessel, above or below the level of the fluid bed $L_2$.

As a specific example of the pressures and densities applicable to this invention, a hydrocarbon oil fluid coking system as is shown in Figure II containing coke particles of 40 to 800 microns, with 175 microns being the average, having a true density of 100 lb./ft.$^3$, may have a fluid bed level $L_1$ in the coking vessel 80 feet above the level $L_4$ of the bend and 67.2 feet above the level $L_3$ of the entrance of the solids to the standpipe. The level $L_2$ of the fluid bed in the heater vessel may be about 80 feet above the level of the bend and the conveying conduit may terminate about 5 feet below this level $L_2$. The density $\rho_1$ of the fluid bed in the coker may be 40.5 lbs./ft.$^3$ and the density $\rho_5$ of the bed in the heater 30 lbs./ft.$^3$.

Under these conditions the coker may have a pressure $P_1$ of 11 p.s.i.g. and the heater a pressure $P_6$ of 12 p.s.i.g. There is then a pressure $P_2$ at the entrance of the conduit of 30 p.s.i.g. and at the exit $P_5$ of 13 p.s.i.g. The density $\rho_2$ of the solids suspension in standpipe 36 is 42 lbs./ft.$^3$, sufficient to increase the pressure about 1 p.s.i. every 3.5 feet. If greater pressure be needed, the standpipe section can be suitably lengthened.

The pressure $P_3$ above the valve may be about 33 p.s.i.g. and there may be a pressure drop over the valve of about 5.3 p.s.i. such that the pressure at the bend is 27.7 p.s.i.g. A pressure loss of 1–3 p.s.i. may be encountered at the bend.

The density $\rho_3$ of the solids suspension in the inclined riser 38 is about 28 lbs./ft.$^3$ and the density $\rho_4$ in the vertical riser 20 lbs./ft.$^3$ after injection of about 0.0753 ft.$^3$ of aerating gas per pound of solid. 0.0552 ft.$^3$ of this aeration gas is added through lines 46 and 48 and 0.0201 ft.$^3$ is added through line 49.

Using a 14" conduit, the rate of solids flow for the above conditions may be 12,000 lbs./(hr.)(ft.$^2$) with a velocity of 4.8 feet/second in the standpipe and 10 feet/second in the vertical riser.

Thus, there is a pressure drop of 12.6 p.s.i. over the inclined and vertical risers of which 0.7 p.s.i. is accounted for by friction leaving 13.1 p.s.i.g. as the static pressure or driving force.

In its broader applications, the invention is applicable to transferring solids of 0 to 1000 microns in size, having true densities of 80 to 200 lbs./ft.$^3$. The solids circulation rate can be 500 to 20,000 lbs./(hr.)(ft.$^2$). The density of the solids suspension can be 30 to 65% of the true density of the solids in the standpipe, 10 to 50% of the true density of the solid in the inclined riser and 4 to 40% of the true density of the solid in the vertical riser.

Having described the invention, what is sought to be protected by Letters Patent is succinctly set forth in the following claims.

What is claimed is:

1. An apparatus of the type described for the conveyance of particulate solids from one zone to another wherein said solids are contacted with gasiform media and wherein there exist different atmospheres, which comprises an elongated conduit system adapted to contain flowing mobilized particulate solids, said system comprising a vertically disposed standpipe section to contain downflowing solids, said standpipe section having an inlet at the uppermost portion and initiating in one of said zones, an acute short radius bend at the base of said vertical section, an inclined section inclined more than 50° from the horizontal, a large radius bend, and a substantially vertical riser section above said inclined section provided with an outlet for admitting said solids to the other of said zones, said acute bend being located a substantial distance below both said inlet and outlet of said conduit system, and a plurality of aeration gas inlets for admitting aeration gas into a plurality of points along the inclined section and into the short radius bend.

2. In a process involving the contacting of separate gaseous streams with a finely divided solid having a true density of 80 to 200 lbs./ft.$^3$ in two separate contacting vessels containing fluidized beds of said finely divided solids, and wherein said finely divided solid, ranging in size from 0 to 1000 microns, with about 175 to 200 microns being average, flows from one of said vessels to the other through a J-shaped conduit interconnecting said vessls, said J-shaped conduit being characterized by a vertically disposed standpipe section ending in an acute bend, an inclined riser section inclined more than 50° from the horizontal, commencing at said bend and terminating in a vertically disposed riser section, said acute bend located a substantial distance below said fluidized bed; the method of controlling the rate of flow of solids between said vessels while limiting pressure surging and while maintaining an effective gas seal therebetween, which comprises flowing said finely divided solids from one of said vessels downwardly through said vertically disposed standpipe to said acute bend while in a mixture with an aerating gas in an amount limited to maintain a relatively dense fluidized body of solids in said standpipe leg; continuing the passage of said solid around said acute bend and upwardly through said inclined riser of substantially greater length than said slanted riser section while admitting aerating gas to said solids in said bend and said inclined riser section, thereafter intermixing additional gas with said solid; passing the intermixture through a vertically disposed riser and then into the other of said vessels; and regulating the amount of gas so intermixed and also regulating the pressure drop over said J-shaped conduit by means of a valve so as to control the rate of flow of the solid between said vessels.

3. The process of claim 2 wherein said solids pass through said J-shaped conduit at a rate of 500 to 20,000 lbs./(hr.) (ft.$^2$) and the solids suspension has a density in the range of 30 to 60% of the true density in said standpipe, a density in the range of 10 to 50% of the true density in said inclined riser section, and a density in the range of 4 to 40% of the true density in said vertically disposed riser section.

4. A conduit system of the type described for circulating with a minimum of aeration relatively coarse free flowing solids that tend to deaerate readily, between fluidized solids reaction vessels wherein there exist different atmospheres; which comprises a vertically disposed standpipe to contain downflowing solids, said standpipe having an upper inlet portion within one of said vessels, valve means for regulating the flow of solids located in said standpipe 1 to 5 diameters from the lower end thereof, an acute bend having a radius of about 1 pipe diameter at the base of said standpipe, a slanted riser inclined more than 50° from the horizontal initiating at said acute bend, a large radius bend initiating at said slanted riser, a vertically disposed riser initiating at said large radius bend and provided with an upper outlet within the other of said vessels, an aerating gas inlet conduit located at said acute bend directed along the axis of said slanted riser, and a plurality of other aerating gas inlet conduits every 4 to 20 feet along said standpipe, every 1 to 3 pipe diameters along said slanted riser, and at the base of said vertically disposed riser.

References Cited in the file of this patent

UNITED STATES PATENTS

| | | |
|---|---|---|
| 2,395,106 | Day et al. | Feb. 19, 1946 |
| 2,488,030 | Scheineman | Nov. 15, 1949 |
| 2,543,884 | Weikert | Mar. 6, 1951 |
| 2,595,909 | Trainer et al. | May 6, 1952 |
| 2,734,853 | Smith et al. | Feb. 14, 1956 |
| 2,736,690 | Mattox | Feb. 28, 1956 |
| 2,763,601 | Martin et al. | Sept. 18, 1956 |